(12) United States Patent
Nishimoto

(10) Patent No.: US 8,688,833 B1
(45) Date of Patent: Apr. 1, 2014

(54) AUTONOMOUS ROBOTIC TELESCOPE SYSTEM

(75) Inventor: Daron L. Nishimoto, Kihei, HI (US)

(73) Assignee: Oceanit Laboratories, Inc., Honolulu, HI (US)

( * ) Notice: Subject to any disclaimer, the term of this patent is extended or adjusted under 35 U.S.C. 154(b) by 2070 days.

(21) Appl. No.: 10/290,527

(22) Filed: Nov. 8, 2002

Related U.S. Application Data

(60) Provisional application No. 60/331,099, filed on Nov. 8, 2001.

(51) Int. Cl.
*G06F 15/173* (2006.01)

(52) U.S. Cl.
USPC .............................. 709/225; 709/203; 348/143

(58) Field of Classification Search
USPC ............ 709/203, 208, 225; 359/399; 348/143
See application file for complete search history.

(56) References Cited

U.S. PATENT DOCUMENTS

| | | | |
|---|---|---|---|
| 3,161,870 A | 12/1964 | Pincoffs | |
| 3,184,739 A | 5/1965 | Frederick et al. | |
| 3,286,955 A | 11/1966 | French et al. | |
| 3,378,835 A | 4/1968 | Mooney, Jr. | |
| 3,378,840 A | 4/1968 | Mooney, Jr. | |
| 3,412,396 A | 11/1968 | Mooney Jr. | |
| 3,448,452 A | 6/1969 | Mooney, Jr. | |
| 3,487,462 A | 12/1969 | Holberg | |
| 3,560,971 A | 2/1971 | Alsberg et. al. | |
| 3,821,751 A | 6/1974 | Loos | |
| 3,981,010 A | 9/1976 | Michelsen | |
| 3,992,708 A | 11/1976 | Olsen et al. | |
| 4,866,447 A | 9/1989 | Loucks | |
| 5,133,050 A * | 7/1992 | George et al. ................. | 345/632 |
| 5,296,860 A | 3/1994 | Li | |
| 6,085,227 A * | 7/2000 | Edlund et al. ................. | 709/203 |
| RE36,944 E | 11/2000 | Li | |
| 6,304,376 B1 * | 10/2001 | Baun et al. ..................... | 359/429 |
| 6,392,799 B1 * | 5/2002 | Baun et al. ..................... | 359/430 |
| 6,452,538 B1 | 9/2002 | Hoffman, III | |
| 6,757,612 B1 | 6/2004 | Talent et al. | |
| 7,046,187 B2 | 5/2006 | Fullerton et al. | |

(Continued)

FOREIGN PATENT DOCUMENTS

WO    WO 00/19695    * 6/2000    ............ H04M 11/00

OTHER PUBLICATIONS

Rifkin, A. Reengineering the Hubble space telescope control center system, May 1997, IEEE Internet Computing, vol. 1 Issue: 3, pp. 28-35.*

(Continued)

*Primary Examiner* — Oleg Survillo
(74) *Attorney, Agent, or Firm* — James Creighton Wray

(57) ABSTRACT

A worldwide network of Autonomous Robotic Telescope Systems (ARTS) tracks and analyzes space objects (satellites, shuttle, space debris, etc.) and astronomical objects (asteroids, comets, supernovas, etc.), and includes the ability to automatically schedule observations using remote, programmable or Internet controllable information networks. The system works with commercial off-the-shelf (COTS) items that include telescopes, mounts, cameras (e.g. CCD), software and computers. The telescope systems operate autonomously and remotely over Internet lines. Automatic scheduling is achieved by programming the slave telescope control computer. Satellite propagators and two line elements necessary for satellite tracking are provided on several Internet sites. Strategically placing these small portable telescope systems around the world enables users to acquire worldwide space object coverage and to be geographically diverse. This is also a cost effective way to provide necessary data to users.

20 Claims, 3 Drawing Sheets

(56) References Cited

U.S. PATENT DOCUMENTS

| | | | | |
|---|---|---|---|---|
| 7,313,763 | B1* | 12/2007 | Bisque et al. | 715/736 |
| 8,275,883 | B2* | 9/2012 | Snoddy et al. | 709/225 |
| 2001/0056472 | A1* | 12/2001 | Chafer | 709/217 |

OTHER PUBLICATIONS

"Ground-Based Electro-Optical Deep Space Surveillance System (GEODSS) (U)", http://www.fas.org/spp/military/program/nssrm/initiatives/geodss.htm, dated to Jan. 16, 2001 via Wayback Machine at http://www.archive.org.*

O'Connor et al., "FARNET Stories Project", http://www.cni.org/docs/farnet/story113.CA.html, dated Oct. 8, 1999 via Wayback Machine at http://www.archive.org.*

Faccenda, "GEODSS: Past and Future Improvements", http://www.mitre.org/work/tech_papers/tech_papers_00/faccenda_geodss/index.html, dated Dec. 2000.*

Gunn, Jerry B.; An amateur robotic observatory; Oct. 1997; Sky & Telescope; vol. 94 Issue 4; 7 pages.*

Guzik, Gregory T., et al.; An observatory for education and public outreach controlled through the World Wide Web; Jan 9, 1998; 12 pages.*

Drummond, Mark, et al.; Flexible scheduling of automatic telescopes over the Internet; 1995; Robotic Telescopes, ASP conference series, vol. 79; 19 pages.*

Conrad, Al., et al.; Remote observing with the Keck telescopes; 1997; SPIE vol. 3112; 12 pages.*

Percival, Jeffrey W.; Remote observing from the bottom up: the architecture of the WIYN telescope control system; 1995; SPIE vol. 2479/33; 8 pages.*

Talent, D. L.; *Analytic Model for Orbital Debris Environment Management*; Journal of Spacecraft and Rockets; vol. 29, No. 4; Jul.-Aug. 1992; pp. 508-513.

Mendell, W. et al.; *Telecommunications Satellite Constellations and the LEO debris Population*; International Aeronautical Federation; IAA-97-IAA.6.5.05; Paper presented at 48th International Astrological Congress; Oct. 6-10, 1997, Turin, Italy; 8 pages.

* cited by examiner

AUTONOMOUS ROBOTIC TELESCOPE SYSTEM

This application claims the benefit of U.S. Provisional Application No. 60/331,099, filed Nov. 8, 2001.

This invention was made with Government support under Contract F29601-01-C-0175 awarded by the DET 8 AF Research Laboratory. The Government has certain rights in this invention.

BACKGROUND OF THE INVENTION

There exists a heightened concern and awareness of space objects (manmade and astronomical) within the space surveillance sector due to the increase in satellite launches by large telecommunications corporations and the International Space Station (ISS). Corporations are spending billions of dollars in launching satellites and need status information in monitoring the "health" of their assets. There is also an increased concern in asteroid/comet follow-up observations by the astronomical community. Large telescopes (e.g. SpaceWatch) are discovering hundreds of asteroids nightly, but need follow-up observations to consistently and accurately determine their orbital elements, especially those of Potentially Hazardous Asteroids (PHA).

SUMMARY OF THE INVENTION

Operation of a worldwide network of Autonomous Robotic Telescope Systems (ARTS) tracks and analyzes space objects (satellites, shuttle, space debris, etc.) and astronomical objects (asteroids, comets, supernovas, etc.), and includes the ability to automatically schedule observations using remote, programmable or Internet controllable information networks.

The inventive system works with commercial off-the-shelf (COTS) items that include telescopes, mounts, cameras (e.g. CCD), software and computers. The inventive telescope systems have the capability to operate autonomously and remotely over Internet lines. Automatic scheduling is achieved by programming the slave telescope control computer. Satellite propagators and two line elements necessary for satellite tracking are available on several Internet sites.

Strategically placing these small portable telescope systems around the world enables users to acquire worldwide space object coverage and to be geographically diverse. This is also a cost-effective way to provide the necessary data to users.

The invention uses COTS products. Currently no worldwide network of operational systems is known to exist.

The invention significantly reduces manpower, time, cost and resources required for manual observations.

The invention monitors the status of increased commercial space objects, including that associated with the International Space Station, and helps the astronomical community with projects that are labeled "mundane" but important to the overall vision of astronomy.

These and further and other objects and features of the invention are apparent in the disclosure, which includes the above and ongoing written specification, with the claims and the drawings.

DETAILED DESCRIPTION OF THE PREFERRED EMBODIMENTS

Figure 1:
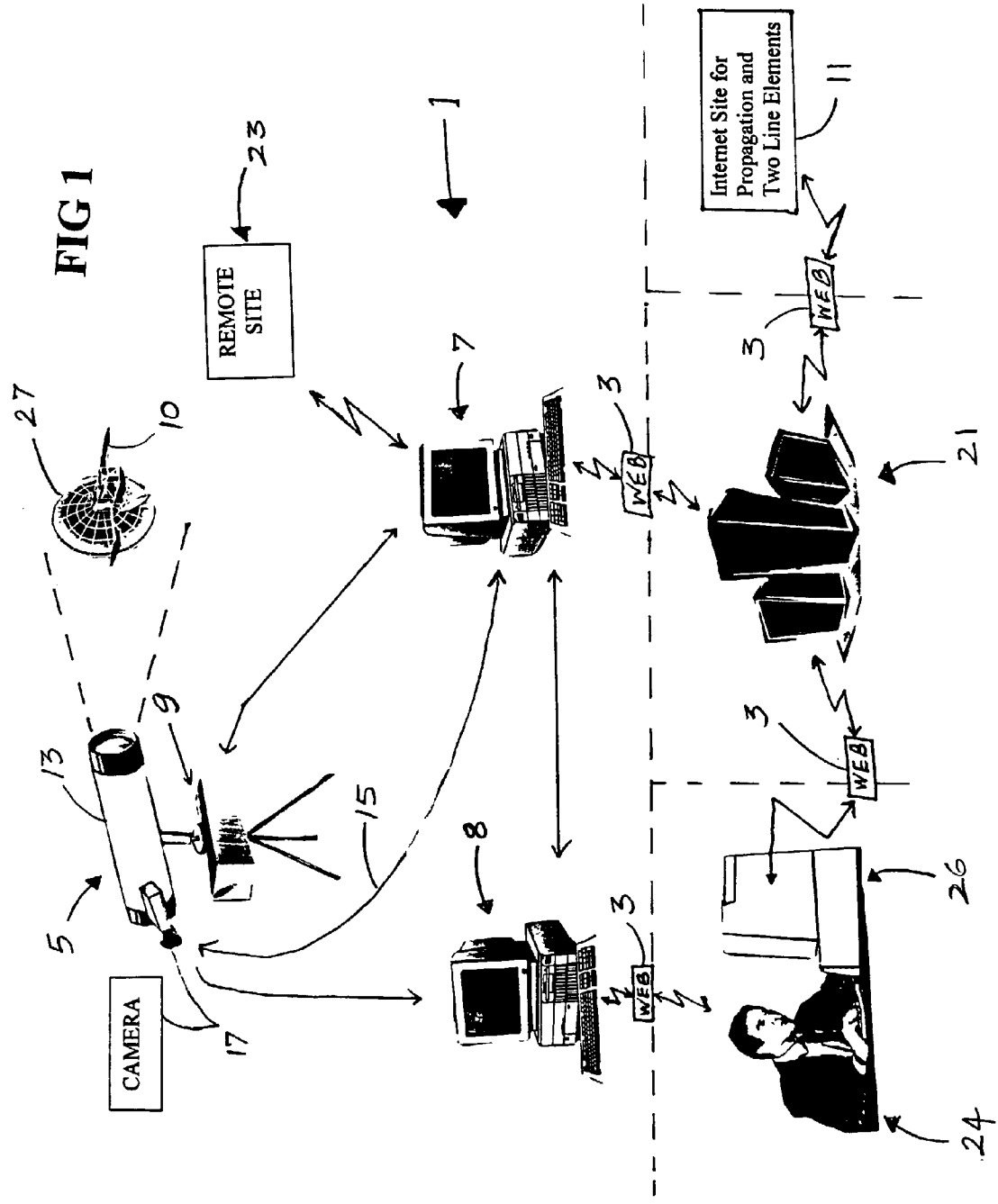
FIG. 1 is a schematic view of an autonomous robotic telescope system.

As shown in FIG. 1, a preferred autonomous robotic telescope system 1 uses interconnections on the web 3. Telescope systems 5 operate autonomously and remotely, being controlled by remote local slave-computers 7, 8, and providing information over the web 3. Automatic scheduling is achieved by programming the telescope control by the slave-computers 7 which are remotely programmable. Satellite antennas 10 and propagators and/or two-line elements 11 are provided for satellite tracking and are available on several web sites. The slave-computer controlled telescopes 13 are positioned by computer-controlled positioners 15, and cameras 17 are controlled by the remote control computers 8. A master server 21 controls the slave-computers 7, 8, the remote telescope systems 5, the satellite antennas 10, and trackers 9. The master server 21 coordinates all of the remote telescope systems 5 and accepts new information from satellite propagators 11, all in real-time. User information sites 26 subscribe to the master server 21 and users 24 receive directed health reports of their assets.

Figure 2:
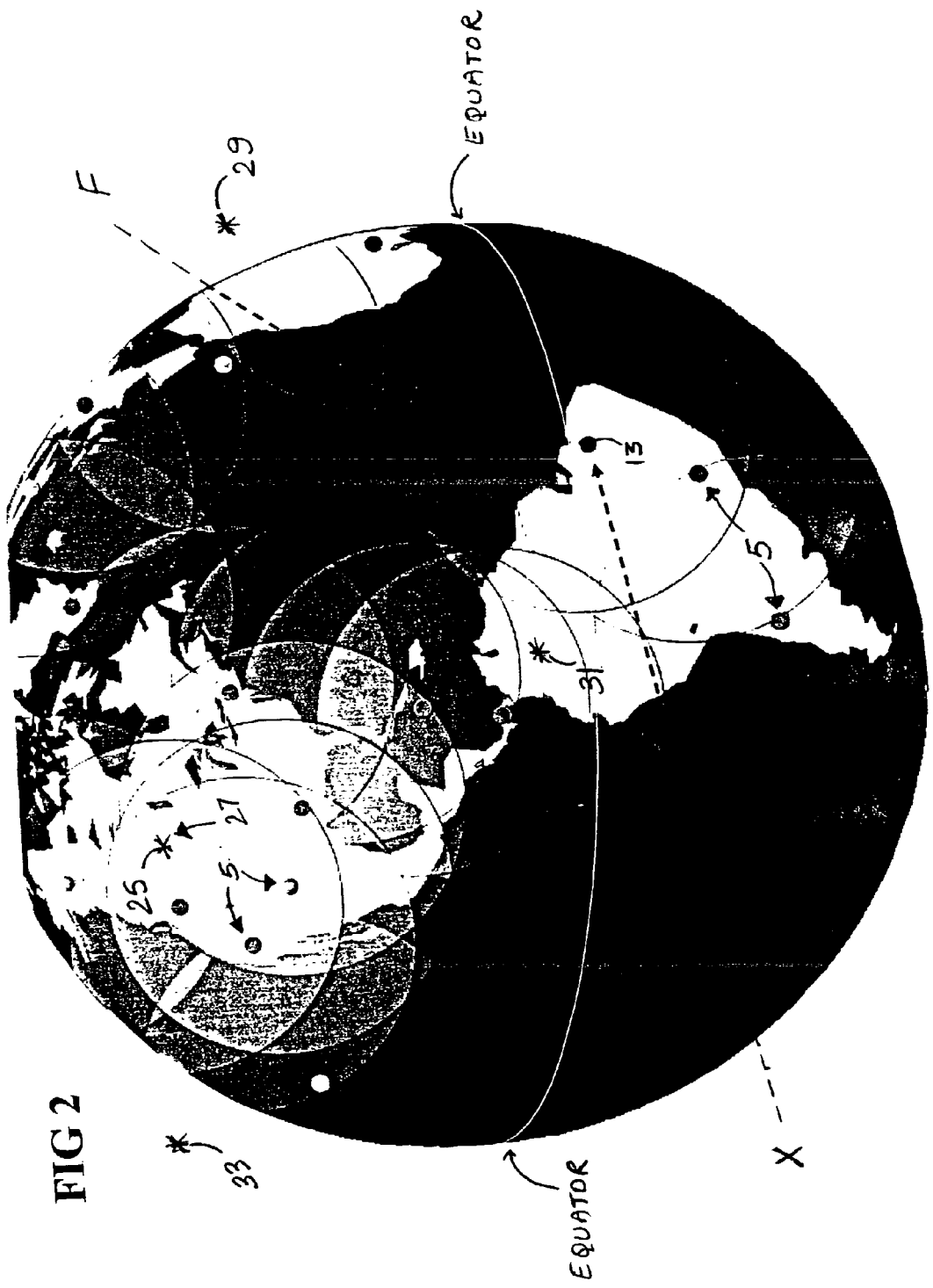
FIG. 2 is a schematic view of a global capture system for space objects.

As shown in FIGS. 1-2, a preferred system includes strategically placing the small portable telescope systems 5 around the world which enables users 24 to acquire worldwide space object coverage and to be geographically diverse. The system 1 is a cost effective way to provide necessary data to users 24. The system 1 tracks and analyzes space objects 25, such as satellites 27, shuttles 29, space debris 31 and astronomical objects 33, such as, but not limited to, asteroids, comets and supernovas. The master server 21 automatically schedules observations by the remote telescope systems 5 and satellite trackers 9 using the remotely programmable controller slave-computers 7 connected together over the web or through web controllable networks at remote sites 23.

As seen in FIG. 2, for an object of interest to be located in, for example, capture site x, the telescope 13 in one of the systems 5 is activated so that it reviews its field of view range F and gathers information about the object. The system allows space surveillance and increases the safety and effectiveness of satellite launches, and provides continuing status information in monitoring health of their satellite assets for users. The system 1 also provides follow-up observations by the remote telescope systems 5, which are preferably preassembled and transported to remote locations around the world to provide follow-up observations of known and newly discovered asteroids to accurately determine their orbital elements.

Figure 3:
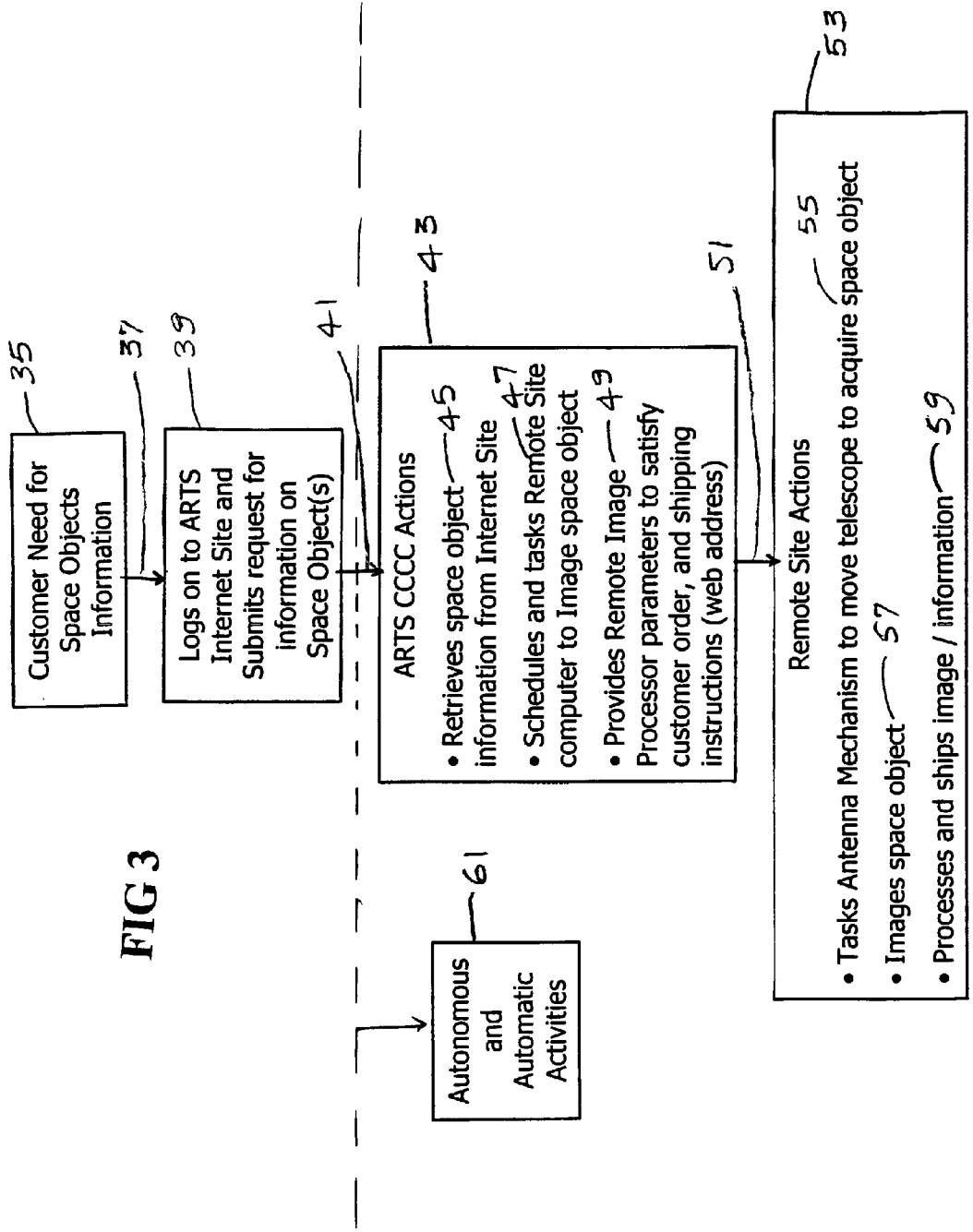
FIG. 3 is a block diagram of the ARTS process.

As shown in FIG. 3, a preferred process using the ARTS system includes, for example, a customer 35 initiating a query about a space object. The customer logs on 37 to ARTS and submits 39 a request for information of space object(s). Once the customer starts 41 the ARTS system 43 a series of autonomous and automatic activities 61 in real-time are set in motion. The ARTS central computer 21 processes the request 43 and retrieves 45 from its database information relating to the requested object by scheduling and tasking 47 the remote site computer 8 to image the object of interest. The system processes the retrieved information, matches it with the requested parameters 49 and provides shipping order to send the information to the customer.

When the ARTS system is activated 43, it communicates 51 with remote site actions 53 to activate and set in motion the required process(es) for retrieving information of the object of interest. These processes may include, for example tasking the antenna mechanism 55 to move a particular telescope 5 to hone-in on the object of interest; the camera is activated to image the object 57. Once captured by the telescope, the remote control computing device processes the image from the camera and ships the image and related information 59 to the ARTS command system. The system then relays that information to the customer, after processing as mentioned earlier.

While the invention has been described with reference to specific embodiments, modifications and variations of the invention may be constructed without departing from the scope of the invention, which is defined in the following claims.

I claim:

1. A method for autonomous location of an object-of-interest in space comprising determining a capture site, disposing computing devices globally, disposing remote telescope systems at global locations, activating a specific remote telescope system disposed within a range of the capture site, reviewing a field of view range of the telescope system, gathering information about the object-of-interest from the telescope system, and conveying gathered information to the computing devices disposed globally, continuously collecting and analyzing space data with the telescope systems, transmitting collected data to the computing devices in real-time, controlling parameters of the telescope systems with the computing devices, and accurately determining orbital elements of different objects in space.

2. The method of claim 1, further comprising reviewing data from space surveillance and tracking debris, thereby increasing safety and effectiveness of satellite launches.

3. The method of claim 2, further comprising interacting the computing devices in real-time, providing continuing status information of the launched satellites and monitoring the launched satellites.

4. The method of claim 3, further comprising providing follow-up observations via the remote telescope systems.

5. A method for detecting and monitoring objects in space comprising a customer initiating a query about an object in space to a master server, setting in motion a series of autonomous and automatic activities in real-time,
wherein the series of autonomous and automatic activities in real-time comprises processing a request, scheduling, tasking, and coordinating remote site computers, imaging an object-of-interest with one or more telescope systems, and retrieving information relating to the object-of-interest, processing the retrieved information, matching the information with requested parameters, providing shipping orders, and sending the information to the customer, controlling the telescope systems and the computing devices in real-time, communicating with remote site actions, activating and setting in motion required processes for retrieving information of the object-of-interest.

6. Autonomous robotic telescope system comprising portable remote telescope systems strategically disposed globally and computing devices communicating with the portable remote telescope systems to enable geographically diverse users to acquire information on worldwide atmospheric objects in space, and
wherein the computing devices further comprises a master server for automatically scheduling observations by the portable remote telescope systems and remotely programmable controller slave-computers communicating in real-time over an interne or through interne controllable networks at remote sites with the master server and the portable remote telescope systems, wherein the master server processes requests for information on one or more objects in space and, based on those requests, automatically and autonomously controls, schedules, tasks, and coordinates the remotely programmable controller slave-computers over the web in order to autonomously track and analyze the objects in space.

7. The system of claim 6, further comprising a computer controlled positioner and tracker for tracking the objects in space.

8. The system of claim 7, wherein the objects are space objects.

9. The system of claim 7, wherein the objects are astronomical objects.

10. The system of claim 6, further comprising satellite antennas and propagators communicating with the master server, the slave-computers and the remote telescope systems.

11. The system of claim 10, further comprising user terminals communicating with the slave-computers and/or the master server for providing information to users of the objects in space.

12. Autonomous robotic telescope space object global capture system comprising
remote autonomous telescope systems having portable telescopes disposed at global locations for locating objects in space,
remote slave-computers, each of which controls at least one of the autonomous telescope systems,
network interconnections for connecting the remote slave-computers,
communication channels connecting the remote slave-computers and the autonomous telescope systems for real-time interactive communication of the remote slave-computers and the autonomous telescope systems,
a master server that processes requests for information on one or more objects in space and, based on those requests, automatically and autonomously controls, schedules, tasks, and coordinates the remote slave-computers over an internet in order to autonomously track and analyze the objects in space, and
remote receiver terminals communicating with the master server for initiating requests for information on objects in space and receiving data from the master server relative to the objects in space.

13. The system of claim 1, further comprising satellites, satellite antennas, satellite propagators and two-line elements communicating with the computers for controlling the autonomous telescope systems, tracking the objects and transmitting information to the autonomous telescope systems and the slave-computers.

14. The system of claim 13, wherein the telescope systems further comprise cameras, computer controlled scheduling, trackers and positioners, and wherein the controls of the telescope systems controlled by the slave-computers enable selective positioning of the cameras, the trackers and the positioners.

15. The system of claim 14, wherein the master server interactively controls the slave-computers, the telescope systems, the satellite antennas, the trackers, the satellite propagators and the receiver terminals in real-time.

16. The system of claim 15, wherein the receiver terminals are user information sites communicating with the master server and with users, and wherein the receiver terminals provide directed health reports of objects-of-interest to users.

17. The system of claim 16, wherein the objects are space objects.

18. The system of claim 17, wherein the objects are selected from a group consisting of satellites, shuttles, space debris, rockets, and combinations thereof.

19. The system of claim 16, wherein the objects are astronomical objects.

20. The system of claim 19, wherein the objects are selected from a group consisting of asteroids, comets, supernovas, and combinations thereof.

\* \* \* \* \*